Patented Aug. 9, 1927.

1,638,713

UNITED STATES PATENT OFFICE.

FREDERICK W. SKIRROW AND OTTO W. HERZBERG, OF SHAWINIGAN FALLS, QUEBEC, CANADA, ASSIGNORS, BY MESNE ASSIGNMENTS, TO CANADIAN ELECTRO PRODUCTS COMPANY, LIMITED, OF MONTREAL, QUEBEC, CANADA.

PROCESS OF MANUFACTURING VINYL ESTERS.

No drawing.    Application filed November 3, 1920. Serial No. 422,693.

This invention relates to improvements in the manufacture of vinyl esters and the object of the invention is to provide a process by which the vinyl esters may be produced to such an extent that the process is commercially and economically satisfactory.

It is known that acetylene in the presence of certain catalysts, such as a mercury compound which is in a suitable physical condition, will combine with carboxylic acids to yield diesters of hypothetical ethylidene glycols. Thus, ethylidene diacetate is formed by passing acetylene into glacial acetic acid in presence of mercuric sulphate, the reaction taking place in accordance with the equation;—

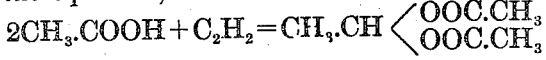

In carrying out this process, the production of ethylidene diacetate is somewhat under the theoretical amount, owing partly to the formation of other bodies. It has been found that among the bodies thus indirectly formed is a small amount of vinyl acetate.

It is possible that in the formation of diesters as above described, the vinyl esters are formed as an intermediate stage by the direct addition to acetylene to the carboxylic acids. In the case of acetic acid, the action would presumably be in accordance with the equation;—

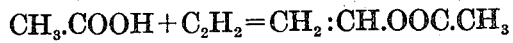

If this is the case the vinyl ester presumably converts to a diester and a small amount remains in unsaturated condition. It has further been discovered that diesters on decomposition give as one of the products of the reaction vinyl esters with the liberation of one molecule of acid. Thus in the case of ethylidene diacetate the reaction takes place as follows;—

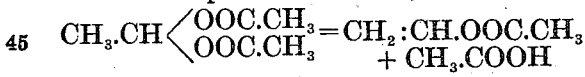

The present invention therefore relates to the preparation of unsaturated or vinyl esters either by passing acetylene into carboxylic acids under suitable conditions or by the conversion of diesters by treatment with suitable catalysts or by both methods combined.

It may be pointed out that in the formation of vinyl esters both by the action of acetylene on carboxylic acids and from diesters, the vinyl esters formed do not represent the greatest bulk of the products of the reaction but it has been discovered that the conditions of the reactions can be so regulated that sufficient yields of vinyl esters are obtained to make the process practical from a manufacturing standpoint.

In the manufacture of ethylidene diacetate by passing acetylene through acetic acid the acetylene gas passes through two condensers arranged in series and is then returned to the reaction vessel, the first of these condensers being a water condenser maintained at about 70° to 100° C. to condense acetic acid and the second being a brine condenser in which aldehyde and other products are condensed. According to the process, the condensate of both condensers is returned to the reaction.

Again, in the decomposition of ethylidene diacetate by means of sulphur dioxide in accordance with copending application Serial No. 422,665, filed November 8th, 1920, the amount of sulphur dioxide dissolved in the diacetate is small, namely 0.1% to 1.0% and the reaction proceeds smoothly, yielding acetic anhydride with a small amount of vinyl acetate and other bodies.

It has been discovered that if, when proceeding as for the manufacture of ethylidene diacetate, the brine condenser is not refluxed to the reaction vessel but the condensate is collected separately, a good yield of vinyl acetate is obtained. It has also been discovered that if, in the decomposition of ethylidene diacetate as previously noted, the amount of decomposing material, such as sulphur dioxide, is increased to over 1% that the amount of vinyl acetate formed is large, amounting to as high as 15% to 25% of the theoretical amount.

The process according to this invention therefore consists in passing acetylene into a carboxylic acid at suitable temperature and pressure, the vaporous products of the reaction being passed through two condensers arranged in series, the first of which is a reflux condenser arranged to return the acid and the diester to the reaction and the second condenser being arranged to resolve the vaporous vinyl ester to liquid state. The diester which is formed by the reaction is then treated, after purification if necessary, with a catalytic or decomposing agent and heated, with the result that a further yield of vinyl ester is obtained. It will thus be seen that the process according to this invention comprises two stages, the first stage being a direct production of a vinyl ester by the combination of acetylene and a carboxylic acid and the second stage being the decomposition of a by-product of the first stage to yield further vinyl ester.

In carrying out the process, the temperature of reaction in the first stage is maintained between 60° and 100° C. and the first condenser, preferably a water condenser, between 70° and 100° C. The second condenser, preferably a brine condenser, is maintained between −15° C. and +20° C. The reaction of the first stage is carried out by means of any suitable catalyst, preferably mercuric sulphate obtained as a precipitate in the acid. The acetylene is used considerably in excess of the combinable amount and external cooling is resorted to to control the temperature of the reaction. Uncombined acetylene may be returned to the reaction vessel for further use by means of a blower or other suitable apparatus. The yield of vinyl ester is 15% to 25% of the theoretical amount.

In the second stage of the process, the diester is heated with a suitable catalyst to a temperature ranging between 100° C. and 170° C. in a reaction vessel fitted with a suitable reflux column to allow aldehyde and vinyl ester to escape but to condense and return to the reaction other decomposition products and undecomposed diesters. The temperature at the top of this column is maintained during the reaction between 40° and 60° C. The aldehyde distilling over contains a considerable amount of vinyl ester while the reaction liquor itself contains much vinyl ester. After the reaction has proceeded until no more distillate comes over, which usually covers a period of 45 hours, the temperature at the top of the column is raised to approximately 110° C. by increased heating of the liquid to distill over vinyl ester which remains in the reaction liquor. Using as a catalyst syrupy phosphoric acid, as explained in application Serial No. 354,225, filed Jan. 26th, 1920, to an amount of approximately 1.4% of the whole, added slowly throughout the reaction, the yield of vinyl ester will be about 15% of the theoretical amount obtainable, only about 80% of the diester having been acted upon. The yield of vinyl ester may be considerably increased by using instead of phosphoric acid an oxide of sulphur dissolved in the reaction liquor in amount up to 10% of the reaction liquor by weight. The yield will be increased by approximately 10% of the theoretical amount, thus bringing the yield up to 25% of the theoretical amount.

The following examples will illustrate the invention:—

*Example 1—First stage.*

10 lbs. of mercuric oxide is added to 100 lbs. of commercial acetic acid in a vessel provided with an agitator. After solution is completed with the production of mercuric acetate and a small amount of water, approximately 4 lbs. of 70% oleum is added, the temperature being maintained between 70° and 80° C. during the addition. The sulphuric anhydride in the oleum combines with the previously liberated water to form sulphuric acid and the whole mass of sulphuric acid precipitates the mercuric acetate as mercuric sulphate. Best results are obtained when approximately only that amount of sulphuric acid necessary to precipitate the sulphate is used. The catalytic agent, mercuric sulphate, is now found in a finely divided and very reactive form. Acetylene is passed into the mixture greatly in excess of the combinable amount, the liquor being maintained preferably at a temperature between 80° and 90° by external cooling and at the same time agitated. Acetylene is rapidly absorbed forming vinyl acetate and ethylidene diacetate. The unabsorbed acetylene gas carries out of the reaction vessel a considerable amount of acetic acid vapor and the major portion of the vinyl acetate which has not been converted to ethylidene diacetate. Some acetaldhyde vapor is also found. This gas and vapor mixture is passed first through a condenser maintained at a temperature of 70° C. to 100° C. The major portion of the acetic acid is condensed and goes back to the reaction for reuse, a U-seal being preferably provided between the vessel and condenser to avoid reverse flow. The remaining gas and vapor mixture passes to a second condenser maintained preferably at a temperature of −15° to +20° C. with the result that acetaldehyde and vinyl acetate are condensed and may be collected. The unabsorbed acetylene may be returned to the reaction by any suitable means. The vinyl acetate may be purified and separated by distillation from the acetaldehyde and the acetic acid carried over.

*Second stage.*

The ethylidene diacetate found in the reaction vessel on the completion of the first stage is preferably freed from sulphuric acid and undesirable bodies present in accordance with Patent No. 1,450,982, granted April 10th, 1923, in order to prevent decomposition and tar formation during purification if such is necessary. Sulphur dioxide gas, up to 10% of the diester by weight, is dissolved in the diacetate and the solution is heated to a temperature of approximately 100° to 170° C., with the result that the ethylidene diacetate is converted into acetaldehyde, acetic anhydride and vinyl acetate. The reaction vessel is provided with a reflux column which allows the aldehyde and some vinyl acetate to escape but condenses the anhydride and ethylidene diacetate. For this purpose, the top of the column is maintained during the decomposition at a temperature of 40° to 60° C. When the reaction slows to such an extent that but little material comes over at this temperature, the temperature at the top of the column is raised to approximately 110° C. by increased application of heat to the liquid to distill over the vinyl acetate, which remains in the reaction liquor. The yield obtained is from 15% to 25% of the theoretical amount, which with the yield of the first stage, amounting to 15% to 25% of the theoretical amount, gives a total production to 25% to 45% of the theoretical, based on the amounts of acetylene and acetic acid originally used.

*Example 2.*

The first stage of the process is conducted as in Example 1 but in the second stage, syrupy phosphoric acid to an amount of 0.4% is used as the catalytic agent instead of sulphur dioxide and is slowly added over a period of approximately eight hours, the reaction being carried out under substantially the same conditions as described in the second stage of Example 1. The yield of vinyl acetate obtained is approximately 15% of the theoretical amount obtainable.

In connection with the first stage of Example 1, it may be stated that if the condensate from the second condenser is returned to the reaction, as well as that from the first, the final yield of vinyl acetate will be very much lower, being approximately 3% and probably not over 5% at the most. If it is found advisable, the first stage of the process may be thus conducted, so that the product is largely ethylidene diacetate and a very small yield of vinyl acetate, and the vinyl acetate then obtained from the ethylidene diacetate. It may be mentioned that wherever ethylidene diacetate is mentioned in the foregoing examples that it need not be absolutely pure but may be the commercial article, which contains anywhere from 5% to 20% of acetic acid. In carrying out the process according to the first stage of Example 1, any of the alternative conditions and catalytic agents, such as are given in detail in copending application Serial No. 422,885, filed November 8th, 1920, may be employed and, in carrying out the second stage, any of the alternative conditions described in copending application Serial No. 422,665, filed November 8, 1920, may also be employed. While the examples deal with the acetic ester and diester, it will be understood that the steps of the process may be carried out with any suitable modifications of the last mentioned application to produce esters and diesters of other carboxylic acids. For example, vinyl formate and ethylidene diformate will be produced from formic acid and vinyl butyrate and ethylidene dibutyrate from butyric acid.

Although the foregoing description specifically mentions only the use of acetic acid and the formation of vinyl acetate, it will be understood that the process applies generally to the formation of vinyl esters of all suitable aliphatic carboxylic acids such as formic, propionic and butyric acids.

While the process is normally carried out at atmospheric pressure it will be understood that it may be carried out equally well at sub-atmospheric or super-atmospheric pressures. It will also be understood that the temperatures mentioned will naturally be somewhat modified according to the acids used and the esters formed, the permissible temperatures, generally speaking, increasing as the higher members of the series are dealt with.

Having thus described our invention, what we claim is:—

1. A process of producing a vinyl ester, which comprises bringing together an excess of acetylene and a carboxylic acid in presence of a cataclyst and removing the vinyl ester as formed from the reaction by maintaining conditions such that the ester is carried out of the reaction in the escaping excess of acetylene.

2. A process of producing a vinyl ester which comprises bringing together in presence of a catalyst a carboxylic acid and acetylene in excess sufficient to entrain vaporous products of the reaction, and fractionally condensing the vaporous products to separate vinyl esters from diesters and acid and returning the diesters and acid to the reaction.

3. A process of making vinyl esters, which comprises causing the reaction of acetylene and a carboxylic acid in presence of a catalyst, substituting a fresh catalyst when the absorption of acetylene substantially ceases and distilling off the vinyl ester as formed throughout the process.

4. A process of making vinyl esters, which comprises causing the reaction of acetylene and a carboxylic acid in presence of a catalyst at a temperature between 60° and 100° C. substituting a fresh catalyst when the absorption of acetylene substantially ceases and maintaining a temperature between 100° and 170° C., and distilling off the vinyl ester as formed throughout.

5. A process of making vinyl esters, which comprises causing the reaction of acetylene with a carboxylic acid in presence of a mercury sulphate as catalyst, neutralizing mineral acid derived from the catalyst, adding a fresh catalyst, increasing the temperature and distilling off the vinyl ester as formed during the whole operation.

6. A process according to claim 5, in which the reaction with the first catalyst is maintained at a temperature between 40° and 100° C., and the reaction with the second catalyst at a temperature between 100° and 170° C.

7. A process of making vinyl acetate, which comprises reacting together acetylene and acetic acid in presence of mercury sulphate as catalyst, neutralizing mineral acid derived from the catalyst, adding a fresh catalyst and increasing the temperature and distilling off vinyl acetate as formed during the whole operation.

8. A process of making vinyl acetate, which comprises causing the reaction of acetylene and acetic acid in presence of mercury sulphate as catalyst at a temperature between 40° and 100° C., adding fresh catalytic material and increasing the temperature to between 100° and 170° C., and distilling off and separating vinyl acetate as formed throughout the process.

9. A process of producing a vinyl ester, which comprises bringing together in presence of a mercury salt as catalyst a carboxylic acid and acetylene in excess sufficient to entrain vaporous products of reaction, while maintaining a temperature at which formed vinyl ester will distill off, and removing the vinyl ester from the reaction in the escaping excess of acetylene.

10. A process for the production of vinyl acetate, which comprises reacting upon acetic acid with an excess of acetylene in presence of a mercury salt as catalyst while maintaining a temperature at which the formed acetate will distill off, and removing the acetate from the reaction in the escaping excess of acetylene.

In witness whereof, we have hereunto set our hands.

FREDERICK W. SKIRROW.
OTTO W. HERZBERG.